Patented May 16, 1939

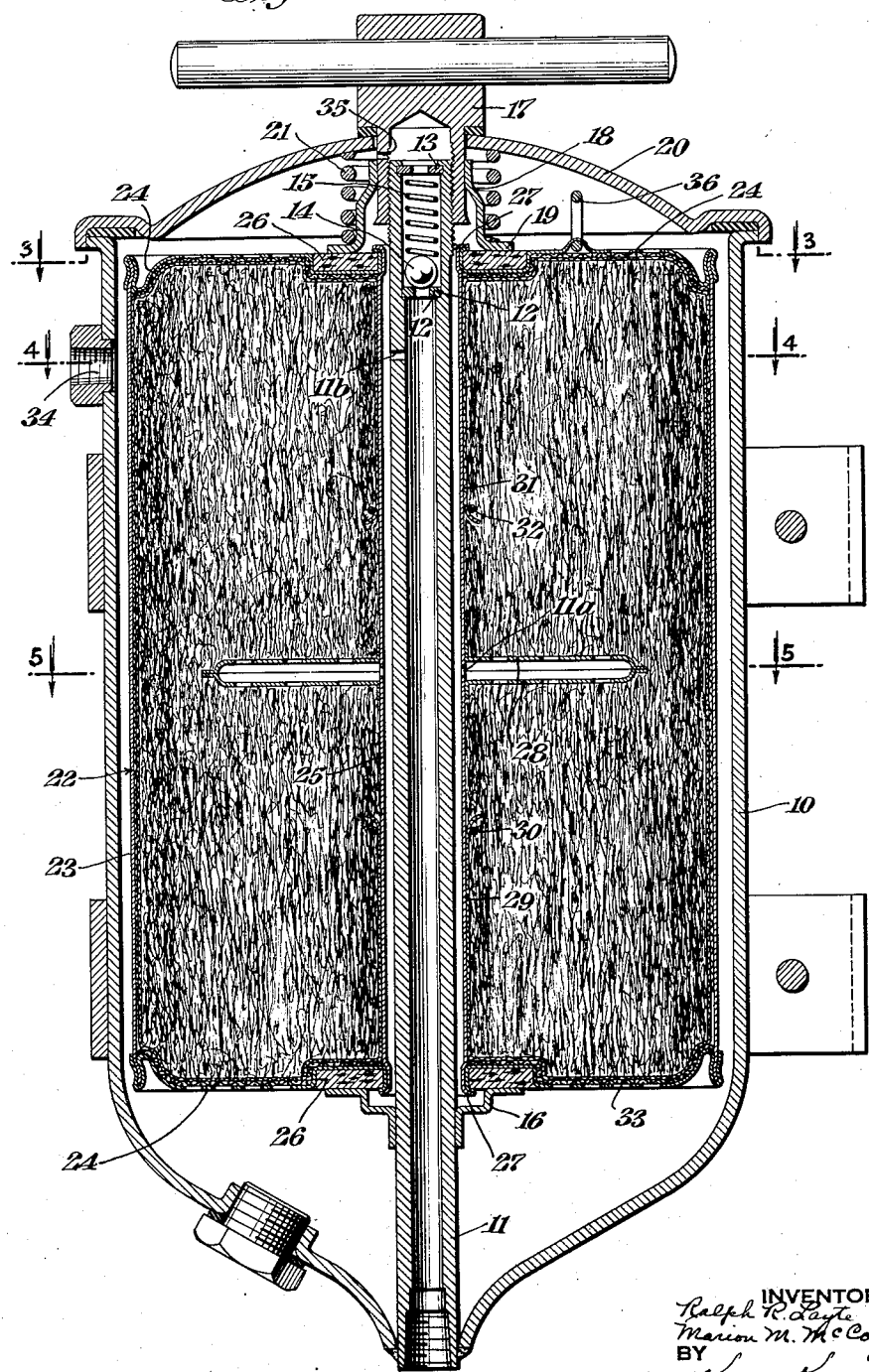

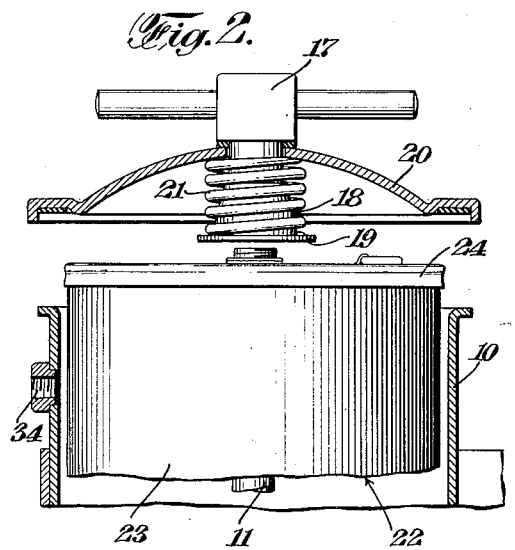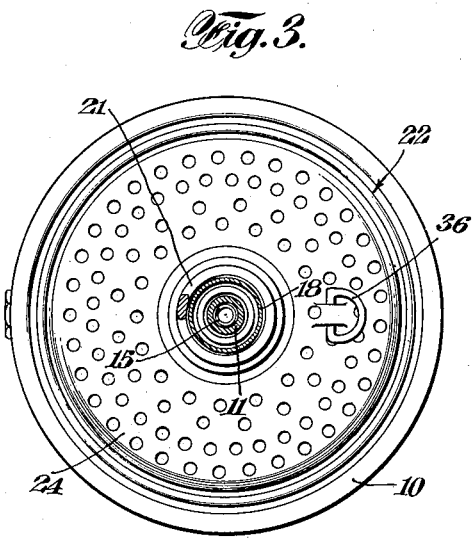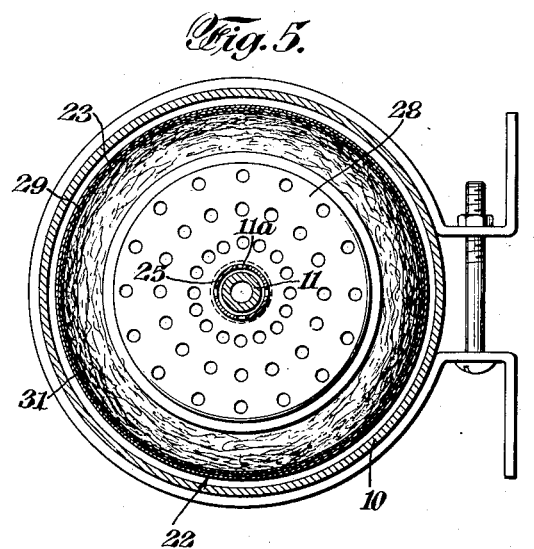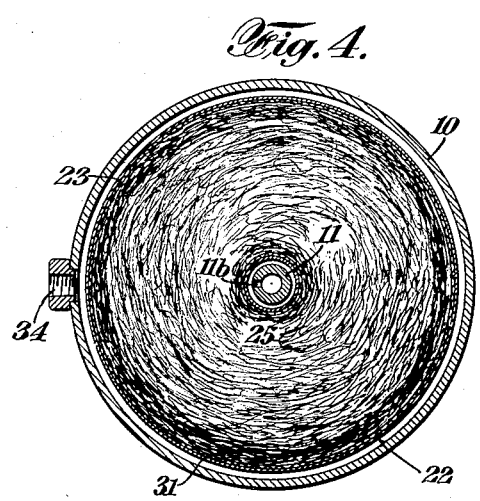

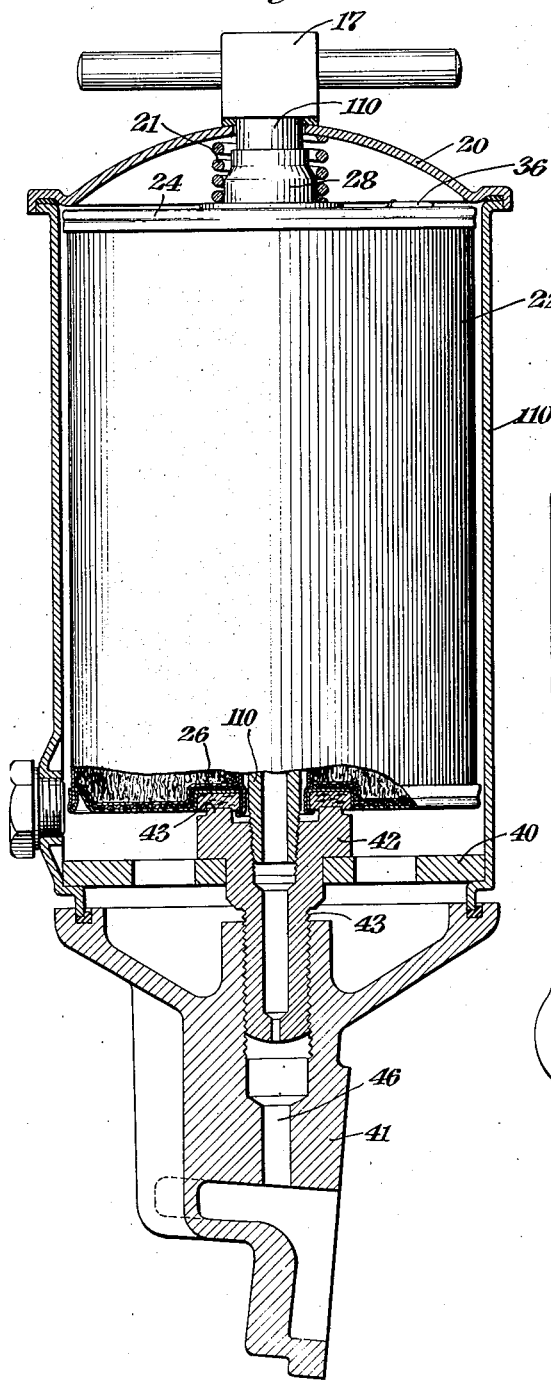
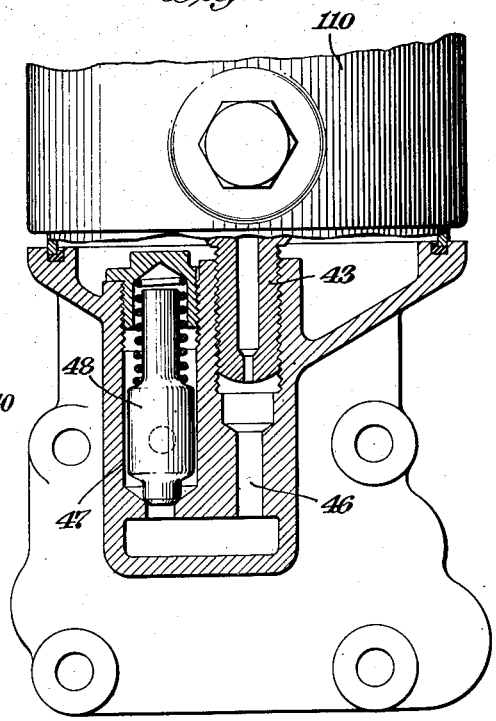

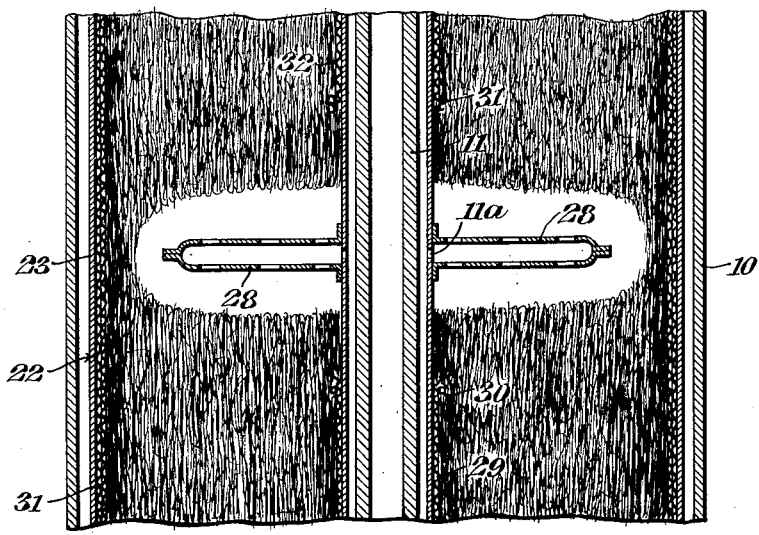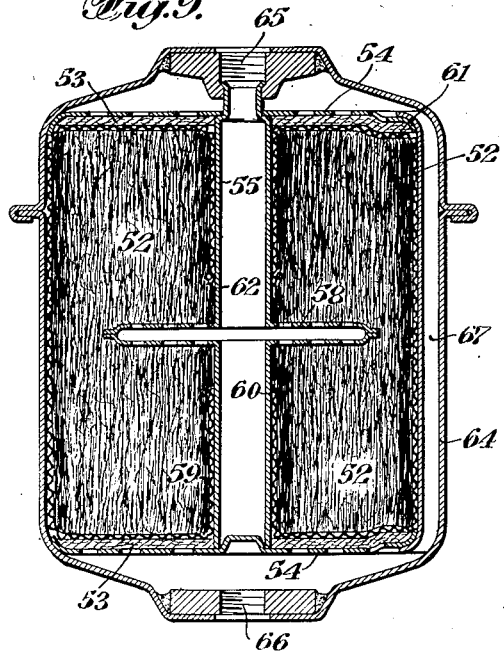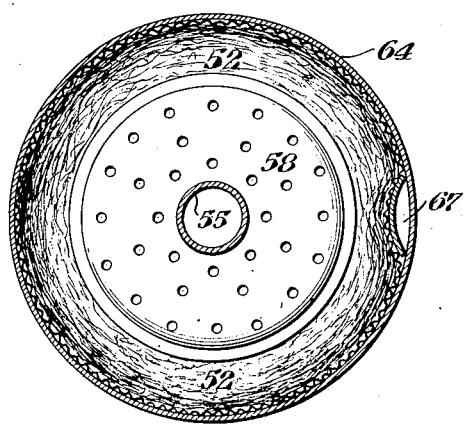

2,158,512

UNITED STATES PATENT OFFICE 2,158,512

FILTER

Ralph R. Layte, Short Hills, and Marion M. McCoy, Whippany, N. J., assignors to Motor Improvements, Inc., Newark, N. J., a corporation of Delaware Application August 19, 1937, Serial No. 159,810

10 Claims. (Cl. 210—131)

This invention relates to filters and more especially to a filter for use in connection with the lubricating system of an internal combustion engine as well as for use in the filtering of fuel oil and the like.

An object of this invention is an expensive self-contained filtering element which is efficient to effect removal of solids from lubricating oil and to maintain the oil clear and of good color over a period of operation of the engine representing several thousand miles travel of the vehicle in which the engine is mounted and which is provided with a casing into which it may be inserted or from which it may be removed easily and quickly, thus facilitating replacement of an exhausted filtering unit by a fresh filtering unit.

A filtering unit embodying the invention consists essentially of a cylindrical mass of preferably fibrous vegetable material surrounding a central tube and enclosed by a metal cylinder having discharge apertures at each end, together with a circular distributor mounted centrally on the tube and extending into the body of fibrous vegetable material. The body of fibrous vegetable material constitutes the filtering medium and is spirally wound around the central tube. The filtering medium may be any suitable material which may be prepared in a manner to adapt it for winding into spiral form. A cloth sock surrounds the central tube at either side of the distributor and extends over one end of the cylinder of filtering medium and along the peripheral surface thereof so that the filtering medium is substantially enclosed in a cloth double jacket. The fibrous vegetable material is loosely wound adjacent the central tube except just at the ends thereof and at which points it is tightly wound. Also, the fibrous material is tightly wound adjacent the periphery of the cylinder. Oil is admitted to the central tube and is introduced through the distributor into the cylinder. The oil then flows through the body of filtering medium and escapes through the ends of the casing. Thus, the oil in its dirty condition flows first through loosely packed filtering medium which is conducive to the removal of solid particles and then through the more tightly packed material. The oil pushes back the filtering material in the region of the distributor to form a pocket and to somewhat compact the loosely wound material. Such action on the part of the oil serves to increase the filtering efficiency of the medium. It also tends to increase the packing of the filtering material against the surface of the casing, thus preventing short-circuiting of the oil around the filtering medium by flow along the inner surface of the casing. All oil is thus forced to pass through sufficient depth of filtering material to effect the desired purification thereof.

Other objects, novel features and advantages of this invention will become apparent from the following specification and accompanying drawings, wherein:

Fig. 1 is a vertical section through a filter embodying the invention;

Fig. 2 is a fragmentary section partially in elevation of the filter with the cover slightly lifted;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a vertical section, partially in elevation, of a modified embodiment, and Fig. 7 is a fragmentary section, partly in elevation, on the line 7—7 of Fig. 6;

Fig. 8 is a fragmentary view similar to Fig. 1,

Fig. 9 is a vertical section through a further embodiment of the invention and

Fig. 10 is a horizontal section through the said further embodiment.

The casing 10 has its lower end inwardly tapered and supports a hollow post 11 extending centrally of the casing and slightly above its upper edge. In the upper end of the post 11 are arranged two spaced washers 12 and 13. A ball 14 is pressed against the washer 12 by a spring 15 interposed between the ball and the washer 13, the ball 14 normally serving to close the opening in the washer 12. Near the bottom of the post 11 is provided a circular stop or support 16 and the upper end of the post 11 is exteriorly threaded to receive a nut 17. A collar 18 is slidably mounted on the lower portion of the nut 17 and has a flange 19 at its lower end. A portion of the nut 17 extends through an aperture in the cover 20 for the shell 10 and between the cover and flange 19 is interposed a spring 21. The sleeve 18 is prevented from slipping off the inner end of the nut 17 by an enlargement formed thereon after assembly of the sleeve and nut.

A cylindrical filtering unit 22 having a central bore is arranged within the casing 10 with the post 11 extending through the bore. The lower end of the unit 22 rests upon the support 16 while the flange 19 of the sleeve 18 engages the top of the unit. The cover 20 is held in place by the nut 17 and the flange 19 is pressed against the top of the unit 22 by the spring 21. The unit 22 consists of a cylindrical imperforate metal casing 23 having perforated metal ends 24 mechanically sealed thereto. Also, a central metal tube 25 extends between the end members 24 and has its ends mechanically sealed to said end members. Each end member is centrally depressed and receives a gasket 26, one of which engages the support 16 and the other of which is engaged by the flange 19. Each end of the tube 25 is bent out slightly to form a flange 27 which holds the corresponding gasket 26 in its socket. A pair of perforated metal disks 28 surround the tube 25 midway the ends thereof and have their edges offset into contact to form a distributor, the plates being arranged at either side of a peripheral row of apertures in the tube 25. Within the casing 22 and surrounding the tube 25 and distributor is a mass of vegetable fibrous material. This material is in the form of a ribbon spirally wound around the tube 25 and distributor. A cloth sock 29 surrounds the lower end of the tube 25 and is secured by a tie member 30. This sock extends down the tube to the end member 24 which it follows out to the casing 23 and then extends along the casing substantially to the other end thereof. A similar sock 31 surrounds the upper end of the tube 25 and is provided with a tie member 32 and extends upwardly along the tube 25 to the top member 28 which it follows out to the member 23 and then extends along the same approximately to the bottom end thereof and enclosing the sock 29. A disk 33 of wool or other similar pervious material resistant to crankcase acid engages the inner surface of each of the end members 24 and serves to prevent the escape of fibrous material through the perforations in the end member.

Oil to be filtered is supplied to the bottom end of the post 11 and passes upwardly therethrough to the aperture 11b through which it escapes into the space between the post 11 and tube 25. From this space, the oil passes through the holes 11a into the distributor. From the distributor, the oil passes out through the perforations in the plates 28 into the body of fibrous vegetable material constituting the filtering medium. The filtered oil escapes from the filtering unit through the perforations in the plates 24 and passes out of the casing through the discharge port 34. In the event that the oil is too viscous to flow through the filtering unit, as for example, when the oil is cold at the time of starting the engine, the oil lifts the ball 14 against the action of the spring 15 and escapes through the washer 13 and aperture 35 in the nut 17 into the interior of the casing from which it is discharged through the outlet port 34.

When it is desired to replace an exhausted filtering unit with a fresh filtering unit, the nut 17 is unscrewed to disengage it from the post 11 and the cover 20 is removed from the casing. The exhausted filtering unit is then lifted out of the casing by means of the handle 36 provided for that purpose and a new unit is inserted after which the cover is replaced and the nut 17 is again engaged with the upper end of the post 11. The spring 21 presses the flange 19 into engagement with the top gasket 26 while the bottom gasket 26 is pressed into engagement with the support 16 by pressure transmitted through the tube 25. A tight seal is thus formed to prevent escape of oil at the ends of the bore of the filtering unit.

In assembling the fibrous vegetable material with the central tube and distributor, the material is wound about the tube rather loosely except at each end of the tube where the ribbon is wound tightly. The loose winding continues out to approximately the rim of the distributor and from this point the material is tightly wound so as to provide a zone of tightly packed filtering material near the periphery of the body. In the winding operation, the fibrous vegetable material is differentially pulled out and manipulated by the operator so as to vary the amount of material applied in different sections as well as the tension under which it is applied. By stringing out the fibrous material differently during the winding operation, the operator is able to produce a generally cylindrical body of fibrous material in which there is an outer zone of more tightly packed fibrous material than the inner zone. During the winding of the material of the outer zone, the density of the material in the inner zone may be slightly increased but the material of the inner zone nevertheless remains less tightly packed than the material in the outer zone. The filtering material is wound on the tube and distributor with the socks 29 and 31 in position on the tube. After the winding has been completed, the socks are drawn over the ends of the filtering body and along the curved surface thereof so that throughout substantially its whole length the filter body is enclosed in two thicknesses of cloth. There is a zone of loosely packed filtering material adjacent the distributor and a surrounding zone of tightly packed filtering material.

Upon passage of oil from the distributor into the filtering body the material directly adjacent the distributor is forced away therefrom to form an open space around the distributor, as shown in Fig. 8. The effect of such movement is to render the filtering material progressively more tightly packed from the open space to the surface of the body and also to force the body surface tightly against the casing to form a tight seal which prevents short circuiting of the oil along the surface of the casing around the filtering material. All the oil is thus forced to pass through a substantial depth of progressively more tightly packed filtering material and thorough cleansing thereof is effected.

As the oil flows through the filter, its velocity is very greatly reduced by reason of the increase in the cross-section of its path. In its passage through the filter, the successive ports are of progressively greater area. It will be noted that the oil is discharged through four openings 11a into the distributor and from the distributor it is discharged through a larger number of openings into the filtering material. Also, it will be noted that the number of openings in each end of the member 24 is greater than the number of openings in a plate 28 so that the oil velocity reduces with its progress through the filtering body. In the passage of oil from the distributor openings to the openings in the plates 28, it flows first through a zone of loosely packed filtering material and then through a zone of tightly packed material. The cross-section of the oil path is larger in the second zone than in the first zone so that the velocity of flow through the tightly packed material is less than the velocity of flow through the loosely packed material but the rate of flow through both zones is the same and is sufficient that the filter may remove impurities from the lubricant of an internal combustion engine substantially as fast as said impurities are produced, thereby maintaining the oil of clear color and free from solids.

In the modification shown in Figs. 6 and 7, the shell 110 is substantially cylindrical throughout its entire length but at its lower end is provided with a shoulder on which is supported an apertured disk 40. A base 41 is provided with a groove into which fits the lower end of the shell 110. A nut 42 has a threaded extension 43 which is received in a threaded recess 44 in the base 41. A hollow post 111 is threaded into the nut 42 and the filtering unit 22 surrounds the post 111, the filtering unit being of the same structure as previously described. The nut 42 clamps the shell 110 to the base 41 through the intermediary of the disk 40 and the cover 20 is held in place as previously described. The bottom disk 26 engages a ridge 45 on the nut 42. The base 41 is provided with an oil inlet passage 46 which communicates through the bore in the extension 43 with the interior of the post 111 to supply oil to the filtering unit as previously described. In the base 41 is provided a by-pass valve 47 controlled by a relief valve 48 for permitting flow of oil when for any reason the resistance of the filter becomes too great.

In Figs. 9 and 10, the invention is disclosed as embodied in a sealed cartridge filter of the well-known type. The filtering unit 52 consists of a cylindrical body of fibrous vegetable filtering material wound about a central tube 55 extending between perforated end members 54 to which its ends are mechanically sealed. A pair of metal perforated disks 58 surround the tube 55 midway the ends thereof, and have their edges offset into contact to form a distributor, said disks being arranged at either side of a peripheral row of apertures in the tube 55. A cloth sock 59 surrounds the lower end of the tube 55 and is secured by a tie member 60. This sock member extends down the tube to the end member 54 which it follows out to the periphery of the body of filtering material and then extends along the body substantially to the end thereof. A similar sock 61 surrounds the upper end of the tube 55 and is provided with a tie member 62. This sock member extends upwardly along the tube 55 to the end member 54 which it follows to the periphery of the filtering body and then extends along the same approximately to the bottom end thereof and encloses the sock 59. A disk 53 of wool or other similar pervious material resistant to crank case acid engages the inner surface of each end member 54 and serves to prevent the escape of fibrous material through the perforations in the end member.

The filtering unit is enclosed in a two-part sealed casing 64 having an inlet 65 and an outlet 66. The tube 55 has one end connected to the inlet 65 and is closed at its other end by the bottom end member 54. Oil is supplied through the inlet to the tube 55 from which it passes into the distributor and then through the filtering material. On the inner surface of the casing is provided a transfer tube 67 by which the chamber at either end of the filtering unit are interconnected. Through the medium of this tube, filtered oil is transferred from the inlet end of the casing to the outlet end from which the filtered oil is discharged through the outlet 66.

The fibrous vegetable material composing the filtering body is assembled with the central tube and distributor as previously described. Also, in the operation of the filtering unit, the loosely-packed material is caused to move away from the distributor to form an open space therearound in the same manner as previously described and with the same result with respect to the progressive packing of the filtering material.

The filtering unit of this invention is equally applicable for the filtration of fuel oil as well as lubricating oil. The fibrous vegetable material composing the filtering body preferably is cotton waste in ribbon form, as such material is very satisfactory and easy to handle, but any other material of similar nature may be made use of. Also, it is to be understood that various modifications may be made in the filter structure above described without in any way departing from the spirit of the invention as defined in the appended claims.

We claim:

1. A filtering unit comprising a tube, a casing surrounding said tube and having perforated end members connected to said tube, an uninterrupted body of fibrous filtering material interposed between said tube and casing, and a perforated distributor on said tube extending into said filtering body and having its periphery spaced from said casing, said filtering material being more tightly packed adjacent the periphery and ends of the body than adjacent the distributor and central portion of the tube.

2. A filtering unit comprising a tube, a casing surrounding said tube and having perforated end members connected to said tube, an uninterrupted body of spirally wound fibrous filtering material interposed between said tube and casing, a perforated distributor on said tube extending into said filtering body and having its periphery spaced from said casing, said material being more tightly wound adjacent the periphery and ends of the body than adjacent the distributor and central portion of the tube.

3. A filtering unit comprising a tube, a casing surrounding said tube and having perforated end members connected to said tube, an uninterrupted body of fibrous filtering material interposed between said tube and casing, and a perforated distributor on said tube extending into said filtering body and having its periphery spaced from said casing, said body of filtering material being progressively more tightly packed from said distributor to the surface of said body.

4. A filtering unit comprising a tube, a casing surrounding said tube and having perforated end members connected to said tube, an uninterrupted body of fibrous filtering material interposed between said tube and casing, and a perforated distributor on said tube extending into said filtering body and having its periphery spaced from said casing, said body of filtering material comprising a zone of loosely packed material adjacent said distributor and a surrounding zone of more tightly packed material.

5. A filtering unit comprising a tube, a casing surrounding said tube and having perforated end members connected to said tube, an uninterrupted body of non-resilient fibrous material interposed between said tube and casing, a perforated distributor on said tube extending into said filtering body and having its periphery spaced from said casing, said filtering material being out of contact with said distributor to form an open space into which the distributor discharges and being progressively more tightly packed from said space to the surface of said body.

6. A filtering unit according to claim 1 characterized by a pair of cloth socks attached to said tube adjacent said distributor, each sock extending along the tube to the end thereof and across the end of the body of material and over the outer face of said body substantially to the opposite end thereof.

7. A filtering unit according to claim 2 characterized by a pair of cloth socks attached to said tube adjacent said distributor, each sock extending along the tube to the end thereof and across the end of the body of material and over the outer face of said body substantially to the opposite end thereof.

8. A filtering unit according to claim 3 characterized by a pair of cloth socks attached to said tube adjacent said distributor, each sock extending along the tube to the end thereof and across the end of the body of material and over the outer face of said body substantially to the opposite end thereof.

9. A filtering unit according to claim 4 characterized by a pair of cloth socks attached to said tube adjacent said distributor, each sock extending along the tube to the end thereof and across the end of the body of material and over the outer face of said body substantially to the opposite end thereof.

10. A filtering unit according to claim 5 characterized by a pair of cloth socks attached to said tube adjacent said distributor, each sock extending along the tube to the end thereof and across the end of the body of material and over the outer face of said body substantially to the opposite end thereof.

RALPH R. LAYTE.
MARION M. McCOY.